United States Patent Office 3,243,383
Patented Mar. 29, 1966

3,243,383
PROCESS FOR REGENERATING CATALYSTS
Robert G. Schultz, Vinita Park, James M. Schuck, Webster Groves, and Lionel T. Wolford, St. Louis, Mo., assignors to Monsanto Company, a corporation of Delaware
No Drawing. Filed Nov. 7, 1963, Ser. No. 322,019
5 Claims. (Cl. 252—411)

This invention relates to catalysts for polymerizing oefins to liquid products. More particularly this invention relates to the art of regenerating spent catalysts which have been used for polymerizing olefins to liquid products.

With the arising need to find desirable catalyst compositions which are useful for dimerizing and polymerizing lower olefins to liquid olefin products having large fractions which are suitable as the alkylating agent in the process for making biodegradable alkylaryl sulfonates, various new catalyst compositions have been proposed for use in such olefin dimerization and polymerization processes. Some of these catalyst compositions are more important than others not only because they catalyze the dimerization and polymerization of lower olefins to liquid olefin products which are of the desirable type for detergent preparation, but also because of the longer catalyst life exhibited by such catalyst compositions. The longer catalyst life of the catalyst composition bears directly on the productivity of the catalyst, i.e., the longer the catalyst life the greater should be the unit weight of liquid product per unit weight of catalyst ratio.

One of the better catalyst composition classes found for lower olefin dimerizations to date has been those catalyst compositions containing cobalt oxide impregnated on a carbon support. By various procedural techniques the cobalt oxide on carbon compositions have been modified and varied so as to give substantially improved conversion and productivity figures. These matters are the subject of other applications.

One of the problems arising as a result of the use of cobalt oxide on carbon compositions as catalysts for dimerizing lower olefins to liquid olefin products has been that once the fresh activated cobalt oxide on carbon catalyst composition has been used in the polymerization and has lost its catalytic activity after extensive time use periods, i.e., once the catalyst has become so spent that it becomes economically necessary to exchange the spent catalyst for fresh catalyst in the olefin polymerization reactor the spent catalyst composition is no longer useful.

Since the cobalt oxide on carbon catalyst compositions are relatively expensive, it is desirable to find ways to get more useful catalytic life from the cobalt oxide on carbon catalysts. This invention provides one way of obtaining more useful catalytic life from spent cobalt oxide on carbon catalysts so that the relative cost per unit of catalyst composition is reduced substantially.

Briefly, we have discovered that when a spent cobalt oxide on carbon catalyst composition which had been used as a catalyst in olefin polymerization reaction is heated to a temperature of from about 250° C. to about 1000° C. in an inert atmosphere, then cooled, and treated with nitric acid, or nitric oxide (NO) or nitrogen dioxide gas ($NO_2$) or mixtures there dried, and then if desired, treated with ammonium hydroxide, dried, and re-activated by heating it to the desired activation temperature, and this re-activated catalyst is used again to dimerize or polymerize lower olefins to liquid olefin products, a large degree or percentage of the original catalytic activity of the fresh new catalyst is restored in terms of unit weight of liquid product per unit weight of catalyst composition productivity. Thus, this invention provides a means for extending the useful life of cobalt oxide on carbon catalyst compositions and thereby lowering the unit cost of the catalyst composition.

This invention is applicable to the regeneration of any activated carbon supported cobalt oxide containing catalyst composition used in the polymerization of lower olefins to liquid olefin products. The cobalt oxide on the carbon may comprise essentially the only metal oxide on the carbon or it may be admixed or co-impregnated into the carbon with minor amounts, relative to the weight of the carbon, of other metal oxides such as iron oxide, chromium oxide, nickel oxide, zinc oxide, zirconium oxide, copper oxide, aluminum oxide, etc. Those catalysts are generally prepared by placing the carbon support in a solution, preferably aqueous, of a heat decomposable salt of the respective metals or of the metal oxide and allowing the absorbed carbon to take up the metal salt or metal oxide solution. The cobalt salt or metal salt or oxide impregnated carbon thus obtained is then dried, and activated by heating it to the desired activation temperature which may vary, depending upon the type of catalyst activity desired. For example, it has been found that for the dimerization of alpha-olefins, it is desirable to activate the cobalt oxide on carbon composition by heating it to from 200° C. to about 300° C. Higher activation temperatures may be used but are less preferred. However, when the cobalt oxide on carbon composition is to be used to catalyze the dimerization of low boiling liquid olefin feed mixtures containing substantial proportions of internal olefin isomers activations obtained by heating the compositions to temperatures above 300° C., preferably 360° to 550° C., and more preferably to about 450° C. to 475° C. are desired, to increase isomerization of the internal olefin isomers to alpha-olefins which will dimerize in the presence of cobalt oxide on carbon.

The process of this invention provides the advantage of regeneration of the cobalt oxide on carbon catalyst without the necessity of re-impregnating the cobalt support with the cobalt salt, e.g., cobalt nitrate, and/or any other metal salt that may be used therewith. With this invention the cobalt originally impregnated into the carbon can be put into an active form again, and hence provides an economical method of extending the catalytic usefulness of any given quantity of cobalt which is used to make the active cobalt oxide on carbon catalyst.

The spent or deactivated cobalt oxide on carbon catalyst is heated in an inert atmosphere in the 250° C. to 1000° C. temperature range. The inert atmosphere may be a substantial vacuum or it may be an inert gaseous atmosphere either static or flowing past the spent catalyst. It is desirable to keep out any substantial amounts of oxidizing or reducing atmosphere such as oxygen, hydrogen, carbon monoxide, i.e. any atmosphere capable of chemical reaction with the components of the catalyst composition. Although the heat treatments of the spent catalyst compositions at the lower and upper limits of temperature stated may be used, heating temperatures of from about 300° C. to about 800° C. are preferred. Temperatures lower than those stated may be used but the necessary time periods to produce any substantial re-activation of the catalyst at those temperatures are not practical. Temperatures above those stated may be used but tend to cause decomposition of the matrix of the catalyst and hence are not preferred. We refer to this heat treatment as the "pyrolyzing" step, and the product therefrom is the "pyrolyzed" catalyst.

The optimum time period for heating the spent catalyst in the stated temperature range will be determined by those skilled in the art and the time will depend upon the type of apparatus used for the heat treatment, the physical and chemical condition of the spent cobalt oxide on carbon catalyst, the degree or percentage of reactivation desired, etc. Generally, however, we have found that heat treatments for time periods of at least about 1 hour are required to effect any substantial degree of re-activation of the catalyst. The upper time limit is not critical but time periods over about 5 hours are not generally needed.

After the heat treatment of the spent catalyst the heated catalyst is cooled to a temperature sufficiently low for the safe treatment thereof with nitric acid or nitric oxide or nitrogen dioxide. Aqueous concentrated nitric acid is the preferred reagent for this step of the process, although more dilute solutions of the acid may also be used. Nitric oxide fumes may also be used if the cooled catalyst is sufficiently wet to form nitric acid in situ, i.e., on the surfaces of the carbon. Another acid which could be used is sulfuric acid although it is not preferred for the regeneration of most cobalt oxide on carbon catalysts.

The acid solution is generally used in excess amounts, i.e., the cooled catalyst is merely allowed to soak up or absorb the acid solution.

Lower quantities can be used, but at least enough acid is used to be stoichiometrically equivalent to the amount of cobalt, referred to as the metal, in the catalyst composition, although we don't know that the acid actually effects a chemical reaction with the cobalt in the matrix of the carbon. We are sure though that this treatment together with the heat treatment which preferably precedes it and the ammoniation step which preferably follows it, causes substantial regeneration of the catalyst composition which is then again suitable for use as a catalyst in lower olefin polymerization to liquid products.

When it is desired to treat the pyrolyzed spent catalyst with nitric oxide or nitrogen dioxide, the pyrolyzed spent catalyst need be cooled only to the extent necessary for passing the nitric oxide or nitrogen dioxide over or through the catalyst. For nitric oxide treatment temperatures on the order of about 50° C. to 160° C. may be used with temperatures on the order of from 100° C. to 150° C. being preferred. For nitrogen dioxide treatment of the cooled pyrolyzed catalyst temperatures on the order of about 50° C. to about 100° C. may be used. Temperatures below these ranges may be used but unnecessarily long treatment times are required. Temperatures much above those stated should not be used with either gas since at somewhat higher temperatures these gases cause an exothermic reaction in the catalyst mass which is difficult to control and which is not desired. Nitric oxide and nitrogen dioxide treatment times are not critical but treatment times of about 1 hour are generally sufficient to afford regeneration of a substantial proportion of the original catalyst activity. Passing the gas over the catalyst for time periods of from 12 to 16 hours have been used without detrimental effect on the catalyst.

We have found that it is usually advantageous, and it is preferred to ammoniate the dried, pyrolyzed, acid treated cobalt oxide on carbon composition prior to reactivation of the composition by the heat treatment, especially when the re-activated catalyst is to be used in alpha-olefin dimerization processes. The drying step which preceded the preferred ammoniation may be sufficient to remove substantially all or only part of any liquid or moisture from the composition before the ammoniation is conducted. In the ammoniation, the dried pyrolyzed, acid treated or nitric oxide or nitrogen dioxide treated spent catalyst is treated with ammonia gas, liquid ammonia, concentrated ammonium hydroxide, or more dilute ammonium hydroxide. These materials are all generally referred to as "ammonium hydroxide" in this specification. For convenience, the dried material is merely added to a vessel containing a sufficient amount of concentrated ammonium hydroxide, and allow the treated composition to soak in the $NH_4OH$ and take up as much as it is able. Then, after drying the ammoniated composition, as before, the ammoniated cobalt oxide on carbon composition may be re-activated as was done with the new cobalt oxide on carbon composition.

We have found that one of the best catalysts that can be used for olefin dimerizations is an ammoniated cobalt oxide on carbon composition. When activated by heating to from about 200° C. to about 300° C. these ammoniated cobalt oxide on carbon catalysts are especially suitable for dimerizing alpha-olefins, particularly gaseous alpha-olefins, to low boiling liquid olefin products containing major proportions of straight chained isomers. This is the subject matter of copending applications, Serial No. 229,192 filed October 8, 1962, and Serial No. 294,750, filed July 12, 1963. Catalyst compositions containing cobalt oxide on carbon mixed with other metal oxides, such as disclosed in copending application Serial No. 312,310, filed September 30, 1963, may also be regenerated according to the process of this invention.

To obtain meaningful comparative data the same spent catalyst was used in Examples 1 to 4 as the standard "stock" spent catalyst in each regeneration, although other spent cobalt oxide on carbon catalyst compositions may also be regenerated by the process of this invention. This catalyst was an ammoniated cobalt oxide on carbon composition. In each example the same re-activating heat treatments were applied to each composition. This involved heating the respective treated spent cobalt oxides on carbon compositions to 275° C. for 2 hours in flowing nitrogen flowing at 87 ml./min. at 35–50 mm. vacuum pressure. In Examples 5 to 7 the same spent cobalt oxide and chromium oxide on carbon catalyst was used to afford comparative results.

*Example 1*

To 500 g. of a commercially available activated carbon (Pittsburgh Coke and Chemical Co.'s type "BPL") there was added 850 ml. of concentrated ammonium hydroxide. The mixture was allowed to stand for 3 hours at room temperature and then vacuum oven dried (130° C.) for 2 hours. It was then air dried overnight and vacuum oven dried for an additional 2 hours, and finally allowed to stand until the weight of the mixture totaled only 666.6 g. at which time it was bottled. Thus 4 grams of this ammoniated carbon was equivalent to 3 grams of untreated carbon plus 1 gram of added ammonium hydroxide solution.

A 150 g. portion of the above ammoniated carbon was added to a solution of 87.3 g. of cobalt nitrate hexahydrate (equivalent to 22.5 g. of CoO) in 140 ml. of water. The mixture was stirred on a hot plate until outwardly dry, and was then allowed to stand in a hood overnight. The mixture was additionally dried by heating it to 120° C. and then vacuum oven dried.

A 300 ml. portion of concentrated ammonium hydroxide was then added to the dried cobalt salt impregnated ammoniated carbon, and the mixture was dried again until the weight of the mixture was 178.5 g.

A 50 g. portion of the above double ammoniated cobalt salt impregnated carbon composition was activated by heating it to 275° C. in a nitrogen stream flowing at 87 ml./min. at 35 mm. vacuum pressure for 2.33 hours.

A 21.7 g. portion of this freshly activated new double ammoniated cobalt oxide on carbon composition was combined in a bomb reactor with about 1300 g. of propylene. The bomb was sealed and rocked for 24 hours at room temperature (25° C.). Upon opening, about 1300 g. of liquid product was poured off the wet catalyst for a 60 g. of liquid product per gram of catalyst productivity.

A 3.0 g. portion of the spent catalyst, obtained above, was re-activated by heating it to 275° C. in flowing nitrogen (87 ml./min.) under 35 mm. vacuum pressure for 2 hours. The final weight was 2.3 g.

This 2.3 g. portion of re-activated spent catalyst was combined with 126.0 g. of propylene in a bomb reactor and shaken at 24 hours at room temperature as before. Upon opening the bomb 116 g. of unreacted propylene vented from the bomb and only 8.8 g. of liquid was poured off 2.8 g. of wet catalyst. The total liquid weight was 9.3 g. (8.8 g.+0.5 g.) for a conversion of 7.4% and a 4.04 grams of liquid product per gram of catalyst productivity. This was less than 10% of the activity of the fresh catalyst, and is used as the standard minimum regeneration example for comparing the following described improvements.

*Example 2*

To 510 g. of a commercially available activated absorbent carbon (Pittsburgh Coke and Chemical Co.'s type "BPL") there was added 800 ml. of concentrated ammonium hydroxide. The mixture was allowed to stand in the air in a hood for 21 hours and then vacuum oven dried for about 80.5 hours.

A 60 gram portion of this ammoniated carbon was added to a solution of 35.0 g. of cobalt nitrate hexahydrate (equivalent to 9 g. of CoO) in 60 ml. of water. The mixture was dried in a vacuum oven overnight and then 100 ml. of concentrated ammonium hydroxide was added to the dried cobalt nitrate impregnated carbon. The ammoniated carbon was then dried in a vacuum oven for 24 hours after which time the weight of the ammoniated cobalt nitrate impregnated carbon, thus obtained, was 70.9 g.

A 30 g. portion of this ammoniated cobalt nitrate impregnated carbon composition was activated by heating it in flowing nitrogen (87 ml./min.) under 35 mm. vacuum pressure for 3 hours. The final weight was 28.6 g. which was divided into 2 portions of 2.1 g. and 26.5 g.

The 26.5 g. portion of activated ammoniated cobalt oxide on carbon composition was combined with 34.0 g. (50 ml.) of heptane and 1008 g. of propylene in a bomb reactor. The bomb reactor was sealed and shaken in a rocker mechanism for 24 hours at 25° C. The bomb reactor was opened and a very small amount of unreacted propylene (not measured) was vented therefrom. Then 917 g. of liquid product was poured off of the wet catalyst. After drying in nitrogen the catalyst weighed 33.2 g. From the total liquid weight (917 g.+6.7 g.) the weight of heptane was subtracted to determine the weight of the liquid product which was 889.7 g. for an 88.5% conversion and a productivity of 33.6 g. of liquid product per gram of catalyst used.

A 9.0 g. portion of the above 33.2 g. of nitrogen dried spent cobalt oxide on carbon catalyst was "pyrolyzed" by heating it in flowing nitrogen to 300° C. at 2 mm. vacuum pressure for 5 hours. The final weight was 7.1 g.

A 2.6 portion of this pyrolyzed catalyst was treated with 5 ml. of concentrated nitric acid and the nitric acid impregnated composition thus obtained was allowed to stand for 18 hours and then vacuum oven dried. Then 5 ml. of concentrated ammonium hydroxide was added to the composition, was then activated by heating it to 275° C. in flowing nitrogen (87 ml./min.) under 35 mm. vacuum for two hours. The final weight of the re-activated catalyst was 2.6 g.

The 2.6 g. portion of re-activated pyrolyzed, HNO₃-treated, NH₄OH treated cobalt oxide on carbon catalyst so obtained was combined with 6.8 g. of heptane (10 ml.) and 100.0 g. of propylene in a bomb reactor. The bomb was sealed and rocked for 24 hours at room temperature (30° C.). After that time the bomb was opened and 11.0 g. of unreacted propylene was vented. Then 90.5 g. of liquid was poured off of 3.0 g. of wet catalyst. The weight of the heptane was subtracted from the total liquid weight (90.5 g.+0.4 g.) to obtain 84.1 g. of liquid product for a conversion of 84.1% and a productivity of 32.3 g. of liquid product per gram of catalyst. This represents a recovery of 96.2% regeneration of the catalytic activity of the fresh new catalyst.

*Example 3*

A 153.5 g. portion of the ammoniated carbon, prepared as described in Example 2, was added to a solution of 89.3 g. of cobalt nitrate hexahydrate (equivalent to 23.0 g. of cobalt oxide) in 165 ml. of water. The mixture was air dried for 5.5 hours, and vacuum oven dried overnight. Then 270 ml. of ammonium hydroxide was added to the dried cobalt nitrate impregnated ammoniated carbon and the mixture was dried again. The final weight was 184 g.

A 50 g. portion of this dried double ammoniated cobalt nitrate impregnated carbon composition was activated by heating it in flowing nitrogen to 275° C. for 2 hours as described in Example 2.

A 17.3 g. portion of this catalyst was combined with 1320.0 g. of propylene in a bomb reactor, and was shaken for 24 hours at room temperature as described in Example 2. When the bomb was opened, 1033 g. of liquid product was poured off 24.4 g. of wet catalyst. The total liquid product weight was 1040.1 g. for a 78.8% conversion and a 60.12 g. of liquid product per gram of catalyst productivity.

A 24 g. portion of the undried spent catalyst was divided into two 12 gram portions. One 12 g. portion was pyrolyzed by heating at 600° C. in a vacuum (about 3 mm. pressure) for 4 hours. The heat was turned off and nitrogen was run through the vessel to cool the material to 300°–350° C. before removing from the tube in which it had been placed. The weight was 8.1 g.

A 3.4 g. portion of this 600° C. pyrolyzed spent catalyst composition was treated with 7 ml. of concentrated nitric acid. The mixture was allowed to stand in a hood at room temperature over a weekend (about 65 hours) and then vacuum oven dried for 7.5 hours. The dried material was then treated with 7 ml. of concentrated ammonium hydroxide and vacuum oven dried. It was then activated by heating to 275° C. for 2 hours as described in Example 2.

A 2.4 g. portion of this regenerated catalyst composition, described above, was combined with 6.8 g. of heptane, and 104 g. of propylene in a bomb. The bomb was sealed and shaken for 24 hours at room temperature as in Example 2. Upon opening 4 g. of unreacted propylene vented from the bomb and then 103.2 g. of liquid was poured off 3.9 g. of wet catalyst. The weight of heptane was subtracted from the total liquid weight (103.2 g.+1.5 g.) to obtain 97.9 g. of liquid product for a 94.3% conversion and a 40.8 g. of liquid product per gram of catalyst productivity. This is a recovery of 68.0% of the original productivity of the fresh catalyst.

*Example 4*

The second 12 g. portion of spent catalyst obtained as described in Example 3 was pyrolyzed by heating it to 750° C. in a vacuum for 4 hours in the same manner as that described in Example 3. The final weight of this material was also 8.1 g.

A 3.3 g. portion of this 750° C. pyrolyzed spent catalyst was treated with nitric acid, dried, treated with ammonium hydroxide, dried again, and activated in the same manner as described in Example 3.

A 2.6 g. portion of this regenerated catalyst was combined with 6.8 g. of heptane, and 109 g. of propylene in a bomb. The bomb was sealed and shaken as described in Example 3. Upon opening, only 3 g. of unreacted propylene vented from the bomb, and 105.5 g. of liquid product was poured off 4.2 g. of wet catalyst. The weight of the heptane (6.8 g.) was deducted from the total liquid weight (105.5 g.+1.6 g.) to obtain 100.3 g. of liquid product for a conversion of 91.9% and a productivity of 38.7 g. of liquid product per gram of catalyst. This represents a recovery of 64.4% of the catalytic activity of the fresh catalyst.

*Example 5*

A freshly prepared mixed metal oxide on carbon catalyst containing 7% of cobalt oxide and 5% chromium oxide on carbon, by weight, was used to dimerize mixed normal hexene feed by passing the feed over the catalyst for a total of 232 hours. The total conversion was 34.7 g. of dodecene product per gram of catalyst used. At the end of the run, the final productivity of the catalyst was 0.013 g. of dodecene per gram of catalyst per hour.

A 20 g. portion of this spent mixed cobalt oxide and chromium oxide on carbon catalyst was heated to 450° C. under 0.5 to 1 mm. vacuum pressure for three hours. After cooling, the catalyst was brought back to atmospheric pressure under nitrogen. The pyrolyzed mixed cobalt oxide and chromium oxide on carbon catalyst was then treated with a stream of commercially available dry nitric oxide by passing the gas through the pyrolyzed catalyst at 150° C. flowing at about 100 ml. per minute for about 16 hours. The nitric oxide treated catalyst thus obtained was then heated in a nitrogen stream flowing at 100 ml. per minute for three hours at 475° C. This nitrogen heat step is equivalent to the normal activation step of the freshly prepared catalyst.

The regenerated catalyst thus obtained was replaced in a continuous flow reactor, and a feed consisting of an equilibrium mixture of normal hexene isomers was passed through the reactor and the catalyst at 150° C. under a pressure of 250 p.s.i.g., and at a space velocity of 1.0 g. of hexene feed per gram of catalyst per hour. After 75 hours the total production was 8.0 gram of dodecene product per gram of regenerated catalyst.

The catalyst was regenerated again using the same heat treatment, the same nitric oxide treatment and the nitrogen activation nitric oxide as described above. This twice regenerated catalyst produced a total of 6.0 g. of dodecene product per gram of catalyst in 56 hours of run. The final productivity was still 0.022 g. of product per gram of catalyst per hour.

When the same spent pyrolyzed catalyst was treated with nitrogen instead of nitric oxide first at 150° C. and then at 475° to reactivate the spent catalyst, the total production of the catalyst was only 0.4 g. of dodecene per gram of catalyst in 24 hours.

*Example 6*

Another freshly prepared 7% cobalt oxide-5% chromium oxide on carbon catalyst, used to dimerize an equilibrium mixture of normal hexenes, as described in Example 5 gave a total production of 31.3 g. of dodecenes per gram of catalyst in 132 hours. The final productivity rate was 0.108 gram of dodecene product per gram of catalyst per hour. The spent cobalt oxide-chromium oxide on carbon catalyst thus obtained was pyrolyzed, i.e., heated in a vacuum as described in Example 5, and then nitrogen dioxide was passed over the cooled pyrolyzed spent catalyst at 70° C.–80° C. for 16 hours. Then the nitrogen dioxide treated catalyst was activated by heating it to 475° C. in flowing nitrogen. The regenerated catalyst, thus obtained, was placed in a continuous reactor with the same type of hexene isomer feed being passed over it at 150° C. After 48 hours the total production was 3.0 g. of dodecene product for gram of regenerated catalyst.

A similar spent pyrolyzed catalyst treated with nitrogen in place of nitrogen dioxide and used as catalyst for hexene dimerization in the same manner gave only 0.1 g. of dodecene product per gram of catalyst in 48 hours.

*Example 7*

A 20 g. portion of the spent mixed cobalt oxide and chromium oxide on carbon catalyst described in Example 5 was heated to 450° C. at 0.5 to 1 mm. vacuum pressure for 5 hours, cooled and then treated with dilute nitric acid, dried, and then activated by heating in flowing nitrogen for three hours at 475° C.

The regenerated cobalt oxide and chromium oxide on carbon catalyst thus obtained was used to dimerize an equilibrium mixture of normal hexene isomers in a continuous flow reactor. The total production of dodecene product was 12.7 g. of product per gram of regenerated catalyst over 144 hours.

We claim:
1. A process for regenerating spent cobalt oxide on carbon catalysts used in olefin polymerization processes which comprises heating the spent cobalt oxide on carbon catalyst composition in an inert atmosphere to a temperature of from about 250° C. to about 1000° C. for at least about 1 hour, cooling the heated spent catalyst composition, treating the cooled spent catalyst composition thus obtained with a member of the group consisting of nitric oxide, nitrogen dioxide, and nitric acid, and activating the treated catalyst by heating it to the desired activation temperature.

2. A process as described in claim 1 wherein the spent cobalt oxide on carbon catalyst contains minor amounts by weight, based on the weight of the total composition, a metal oxide selected from the group consisting of iron oxide, chromium oxide, nickel oxide, zinc oxide, zirconium oxide, copper oxide and aluminum oxide on the carbon support in addition to the cobalt oxide.

3. A process as described in claim 1 wherein the spent cobalt oxide on carbon catalyst composition is a spent ammoniated cobalt oxide on carbon catalyst composition.

4. A process for regenerating spent cobalt oxide on carbon catalyst compositions which comprises heating the spent cobalt oxide on carbon catalyst composition in an inert atmosphere to a temperature of from about 300° C. to about 750° C. for a period of from about 1 to about 5 hours, cooling the heated spent catalyst composition, treating the cooled spent catalyst composition with concentrated nitric acid in an amount at least equivalent to the amount of cobalt in the catalyst composition, drying the nitric acid treated catalyst composition, treating the dried catalyst composition with an excess of concentrated ammonium hydroxide, drying the ammoniated catalyst composition, and activating the composition by heating it in an inert atmosphere to the desired activation temperature.

5. A process for regenerating spent cobalt oxide on carbon catalyst compositions which comprises heating the spent cobalt oxide on carbon catalyst in an inert atmosphere to a temperature of from about 300° to about 750° C. for a period of from about 1 to about 5 hours, cooling the heated spent catalyst composition, treating the cooled catalyst composition with nitric oxide gas at a temperature of from about 50° C. to about 160° C., and then activating the nitric oxide treated catalyst composition by heating it in an inert atmosphere to the desired activation temperature.

References Cited by the Examiner

UNITED STATES PATENTS

| | | | |
|---|---|---|---|
| 2,209,458 | 7/1940 | Heard et al. | 196—50 |
| 2,369,139 | 2/1945 | Deitz | 252—296 |
| 2,479,884 | 8/1949 | West | 252—415 |
| 2,692,295 | 10/1954 | Peters | 260—683.15 |

BENJAMIN HENKIN, *Primary Examiner.*

MAURICE A. BRINDISI, *Examiner.*

H. S. MILLER, *Assistant Examiner.*